(12) United States Patent
Chou et al.

(10) Patent No.: US 10,852,883 B2
(45) Date of Patent: Dec. 1, 2020

(54) TOUCH CONTROLLERS, DEMODULATION METHODS AND TOUCH SYSTEMS

(71) Applicant: SHENZHEN GOODIX TECHNOLOGY CO., LTD., Guangdong (CN)

(72) Inventors: Hsin-Jui Chou, Guangdong (CN); Ya-Nan Wen, Guangdong (CN); Yingsi Liang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/406,690

(22) Filed: May 8, 2019

(65) Prior Publication Data

US 2019/0265857 A1    Aug. 29, 2019

Related U.S. Application Data

(63) Continuation of application No. PCT/CN2018/075195, filed on Feb. 5, 2018.

(51) Int. Cl.
*G06F 3/041*    (2006.01)
*G06F 3/047*    (2006.01)

(52) U.S. Cl.
CPC .......... *G06F 3/04164* (2019.05); *G06F 3/047* (2013.01)

(58) Field of Classification Search
CPC ...... G06F 3/04164; G06F 3/047; G06F 3/044; G06F 3/0416
See application file for complete search history.

(56) References Cited

U.S. PATENT DOCUMENTS

2013/0285976 A1* 10/2013 Kuo ................. G06F 3/044
                                                     345/174
2014/0028616 A1*  1/2014 Furutani ........... G02F 1/13338
                                                     345/174
(Continued)

FOREIGN PATENT DOCUMENTS

| CN | 103376968 A | 10/2013 |
| CN | 105389038 A | 3/2016 |
| CN | 106201129 A | 12/2016 |

OTHER PUBLICATIONS

English Abstract Translation of Foreign Patent Document CN103376968A.

(Continued)

*Primary Examiner* — Brent D Castiaux
(74) *Attorney, Agent, or Firm* — WPAT, P.C., Intellectual Property Attorneys; Anthony King

(57) ABSTRACT

A touch controller (16) includes: a signal generating module (12), coupled to a plurality of transmit electrodes (TE1~TEM) of a touch panel, and is configured to output a first transmitting signal to a first transmit electrode (TEa) and simultaneously output a second transmitting signal to a second transmit electrode (TEb), wherein the first transmitting signal has a first phase, the second transmitting signal has a second phase; and a demodulating module (14), coupled to a plurality of receive electrodes (RE1~REN) of the touch panel, and is configured to calculate a first amplitude (A) corresponding to the first phase and a second amplitude (B) corresponding to the second phase of the receiving signal according to a receiving signal (RXn) of a receive electrode (REn) of the plurality of receive electrodes.

20 Claims, 6 Drawing Sheets

(56) References Cited

U.S. PATENT DOCUMENTS

| | | |
|---|---|---|
| 2015/0138145 A1 | 5/2015 | Hwang et al. |
| 2016/0062547 A1* | 3/2016 | Hong ................... G06F 3/0418 |
| | | 345/173 |
| 2016/0170516 A1* | 6/2016 | Crandall ................ G06F 3/044 |
| | | 345/174 |
| 2017/0068376 A1* | 3/2017 | Kim ....................... G06F 3/044 |

OTHER PUBLICATIONS

English Abstract Translation of Foreign Patent Document CN105389038A.
English Abstract Translation of Foreign Patent Document CN106201129A.
International Search Report of PCT/CN2018/075195.

* cited by examiner

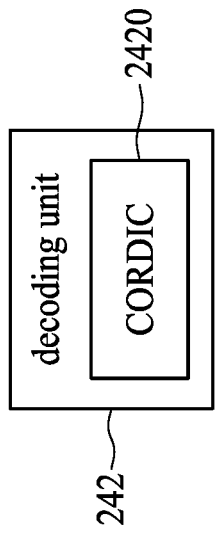

FIG. 4 using the signal generating module 12 to output the first transmitting signal $TX_a$ to the first transmit electrode $TE_a$ and simultaneously output the second transmitting signal $TX_b$ to the second transmit electrode $TE_b$, wherein the first transmitting signal $TX_a$ has the first phase $\theta_a$, the second transmitting signal $TX_b$ has the second phase $\theta_b$, wherein the first phase and the second phase are different using the demodulating module 14 to receive the receiving signal $RX_n$ of the receive electrodes $RE_n$, and to calculate the first amplitude A corresponding to first phase $\theta_a$ and the second amplitude B corresponding to the second phase $\theta_b$ in the receiving signal $RX_n$

FIG. 5

TOUCH CONTROLLERS, DEMODULATION METHODS AND TOUCH SYSTEMS

CROSS REFERENCE TO RELATED APPLICATIONS

The present application is a continuation of international application No. PCT/CN2018/075195, filed on Feb. 5, 2018, of which is incorporated herein by reference in its entirety.

TECHNICAL FIELD

The present disclosure relates generally to a touch controller, demodulation method and touch system, and in particular, to a touch controller, demodulation method and touch system with a reduced signal bandwidth.

BACKGROUND

With the advancement of technology, the operation interfaces of various electronic devices are getting more and more user friendly. For example, by using the touch panel, users may operate directly on the screen or inputting messages/texts/patterns using the finger or stylus, without using the input devices such as the keypad or buttons. In fact, a touch screen often includes a touch-sensitive panel and a display disposed behind the touch-sensitive panel. The electronic device may, according to the position at which the user contacts the touch-sensitive panel and the screen image displayed by the display at that time, determine the meaning of said contact and perform a corresponding operation result.

Currently, the touch control technology has been developed to simultaneously (at the same time) code two transmit electrodes of a touch system using two signals with different frequencies and mutually orthogonal (that is, transmitting tow signals to two electrodes); since the coded signals are orthogonal to each other, during the demodulation process, it is feasible to discriminate the signals carried by different frequencies. The spectrum of two mutually orthogonal signals as provided in FIG. 7 have the frequencies of ta and tb, respectively; the signal frequencies corresponding to two mutually orthogonal signals shall keep a certain frequency interval with each other, so as to maintain the mutual orthogonality therebetween. However, when transmitting two or more mutually orthogonal signals, the bandwidth occupied by the signal (the "signal bandwidth" for short) is greater, and one should make sure that there is no other interference within the signal bandwidth, thereby increasing the difficulty in designing the touch system.

Therefore, a goal sought after by the related art is how to reduce the signal bandwidth when simultaneously transmitting a plurality of signals to a plurality of electrode.

BRIEF SUMMARY OF THE INVENTION

In view of the foregoing, the purpose of some embodiments of the present disclosure is to provide a touch controller, demodulation method and touch system with a reduced signal bandwidth, so as to address the disadvantages of the conventional art.

To address the above-mentioned issue, embodiments of the present disclosure provide a touch controller, which includes, a signal generating module, coupled to a plurality of transmit electrodes of a touch panel and configured to output a first transmitting signal to a first transmit electrode of the plurality of transmit electrodes and simultaneously output a second transmitting signal to a second transmit electrode of the plurality of transmit electrodes, wherein the first transmitting signal has a first phase, and the second transmitting signal has a second phase different from first phase; and a demodulating module, coupled to a plurality of receive electrodes of the touch panel and configured to receive a receiving signal at a receive electrode of the plurality of receive electrodes, and calculate a first amplitude corresponding to the first phase and a second amplitude according to the second phase of the receiving signal according to the receiving signal; wherein, the first amplitude is configured to determine a capacitance between the first transmit electrode and the receive electrode, and the second amplitude is configured to determine a capacitance between the second transmit electrode and the receive electrode.

For example, the signal generating module outputs the first transmitting signal to the first transmit electrodes at a first time, and the demodulating module receives a first receiving signal of a receive electrode of the plurality of receive electrodes the first time, and generates a first component and a second component corresponding to the first receiving signal; the signal generating module outputs the second transmitting signal to the second transmit electrode at a second time, and the demodulating module receives a second receiving signal at the receive electrode at the second time, and generates a third component and a fourth component corresponding to the second receiving signal; the signal generating module outputs the first transmitting signal to the first transmit electrode at a third time and simultaneously outputs the second transmitting signal to the second transmit electrode, and the demodulating module receives a third receiving signal at the receive electrode at the third time, and generates a fifth component and a sixth component corresponding to the third receiving signal; and the demodulating module performs a calculation to the fifth component and the sixth component according to the first component, the second component, the third component and the fourth component, to calculate the first amplitude corresponding to the first phase and the second amplitude corresponding to the second phase of the third receiving signal.

For example, the demodulating module is configured to perform the following steps, so as to perform the calculation to the fifth component and the sixth component according to the first component, the second component, the third component and the fourth component, to calculate the first amplitude corresponding to the first phase and the second amplitude corresponding to the second phase of the third receiving signal: calculating a first receiving phase angle between the first transmit electrode and the receive electrode according to the first component and the second component; calculating a second receiving phase angle between the second transmit electrode and the receive electrode according to the third component and the fourth component; performing a coordinate rotation calculation to a first coordinate with respect to the second receiving phase angle, thereby obtaining a seventh component of a second coordinate, wherein the first coordinate is formed from the fifth component and the sixth component, and the seventh component is the component of the second coordinate in a first dimension; performing a coordinate rotation calculation to the first coordinate with respect to the first receiving phase angle, thereby obtaining an eighth component of a third coordinate, wherein the eighth component is the component of the third coordinate in a second dimension, and the first dimension and the second dimension are orthogonal; and obtaining the first amplitude according to the seventh component and obtaining the second amplitude according to the eighth component.

For example, the demodulating module includes a coordinate rotation digital computer (CORDIC) and is configured to use a CORDIC algorithm to perform the following steps: calculating the corresponding the first receiving phase angle according to the first component and the second component; calculating the second receiving phase angle according to the third component and the fourth component; performing a coordinate rotation calculation to the first coordinate with respect to the second receiving phase angle, thereby obtaining the seventh component of the second coordinate; and performing a coordinate rotation calculation to the first coordinate with respect to the first receiving phase angle, thereby obtaining the eighth component of the third coordinate.

For example, the demodulating module is configured to perform the step of performing the calculation to the fifth component and the sixth component according to the first component, the second component, the third component and the fourth component, to calculate the first amplitude corresponding to the first phase and the second amplitude corresponding to the second phase of the third receiving signal includes the step of: forming a decoding matrix according to the first component, the second component, the third component and the fourth component, wherein this step further includes the steps of: forming a first vector according to the fifth component and the sixth component; multiplying the decoding matrix with the first vector, thereby obtaining a second vector; and obtaining the first amplitude and the second amplitude according to the second vector.

For example, the decoding matrix is in direct proportion to $$\begin{bmatrix} Q_B & -I_B \\ -Q_A & I_A \end{bmatrix},$$

wherein $I_A$ represents the first component. $Q_A$ represents the second component, $I_B$ represents the third component, and $Q_B$ represents the fourth component.

For example, the first component is an in-phase component of the first receiving signal, the third component is an in-phase component of the second receiving signal, the fifth component is an in-phase component of the third receiving signal, the second component is a quadrature component of the first receiving signal, the fourth component is a quadrature component of the second receiving signal, and the sixth component is a quadrature component of the third receiving signal.

For example, the first component is the component of the first receiving signal corresponding to the first phase, the third component is the component of the second receiving signal corresponding to the first phase, the fifth component is the component of the third receiving signal corresponding to the first phase, the second component is the component of the first receiving signal corresponding to the second phase, the fourth component is the component of the second receiving signal corresponding to the second phase, and the sixth component is the component of the third receiving signal corresponding to the second phase.

Embodiments of the present disclosure further provide a demodulation method for use in the touch controller of a touch system, wherein the touch controller includes a signal generating module and a demodulating module, and the demodulation method includes: outputting a first transmitting signal to a first transmit electrode of a plurality of transmit electrodes of a touch panel and simultaneously outputting a second transmitting signal to a second transmit electrode of the plurality of transmit electrodes, wherein the first transmitting signal has a first phase, and the second transmitting signal has a second phase; and receiving a receiving signal at a receive electrode of a plurality of receive electrodes of the touch panel, and calculating a first amplitude corresponding to the first phase and a second amplitude corresponding to the second phase of the receiving signal according to the receiving signal; wherein, the first amplitude is configured to determine a capacitance between the first transmit electrode and the receive electrode, and the second amplitude is configured to determine a capacitance between the second transmit electrode and the receive electrode.

Embodiments of the present disclosure further provide a touch system, including: a touch panel and a touch controller, wherein the touch panel includes a plurality of transmit electrodes and a plurality of receive electrodes; the touch controller includes a signal generating module, coupled to the plurality of transmit electrodes of the touch panel and configured to output a first transmitting signal to a first transmit electrode of the plurality of transmit electrodes and simultaneously output a second transmitting signal to a second transmit electrode of the plurality of transmit electrodes, wherein the first transmitting signal has a first phase, and the second transmitting signal has a second phase different from the first phase; and a demodulating module, coupled to a plurality of receive electrodes of the touch panel and configured to receive a receiving signal at a receive electrode of the plurality of receive electrodes, and calculate a first amplitude corresponding to the first phase and a second amplitude corresponding to the second phase of the receiving signal according to the receiving signal; wherein, the first amplitude is configured to determine a capacitance between the first transmit electrode and the receive electrode, and the second amplitude is configured to determine a capacitance between the second transmit electrode and the receive electrode.

Embodiments of the present disclosure uses a decoding matrix to demodulate non-orthogonal transmitting signals, thereby calculating the energy corresponding to a plurality of transmitting signal, and determining the coordinate at which the touch event takes place. Compared with conventional arts, the present disclosure has the advantage of using a reduced signal bandwidth.

BRIEF DESCRIPTION OF THE DRAWINGS

FIG. 4 is a schematic diagramming illustrating a decoding unit according to embodiments of the present disclosure;

FIG. 5 is a flow diagram illustrating process flow according to embodiments of the present disclosure;

DETAILED DESCRIPTION

Purposes, technical solution, and advantages of the present disclosure are best understood from the following detailed description when read with the accompanying figures. As could be appreciated, specific embodiments discussed herein are provided for the purpose of explanations to the present disclosure, and shall not be construed to limit the present disclosure.

The present disclosure uses two transmitting signals with the same frequency but different phases to code two transmit electrodes, and thus, it is feasible to, via demodulation, obtain two amplitudes corresponding to said two transmitting signal (with different phases), without the need of introducing additional bandwidths.

Figure 1:
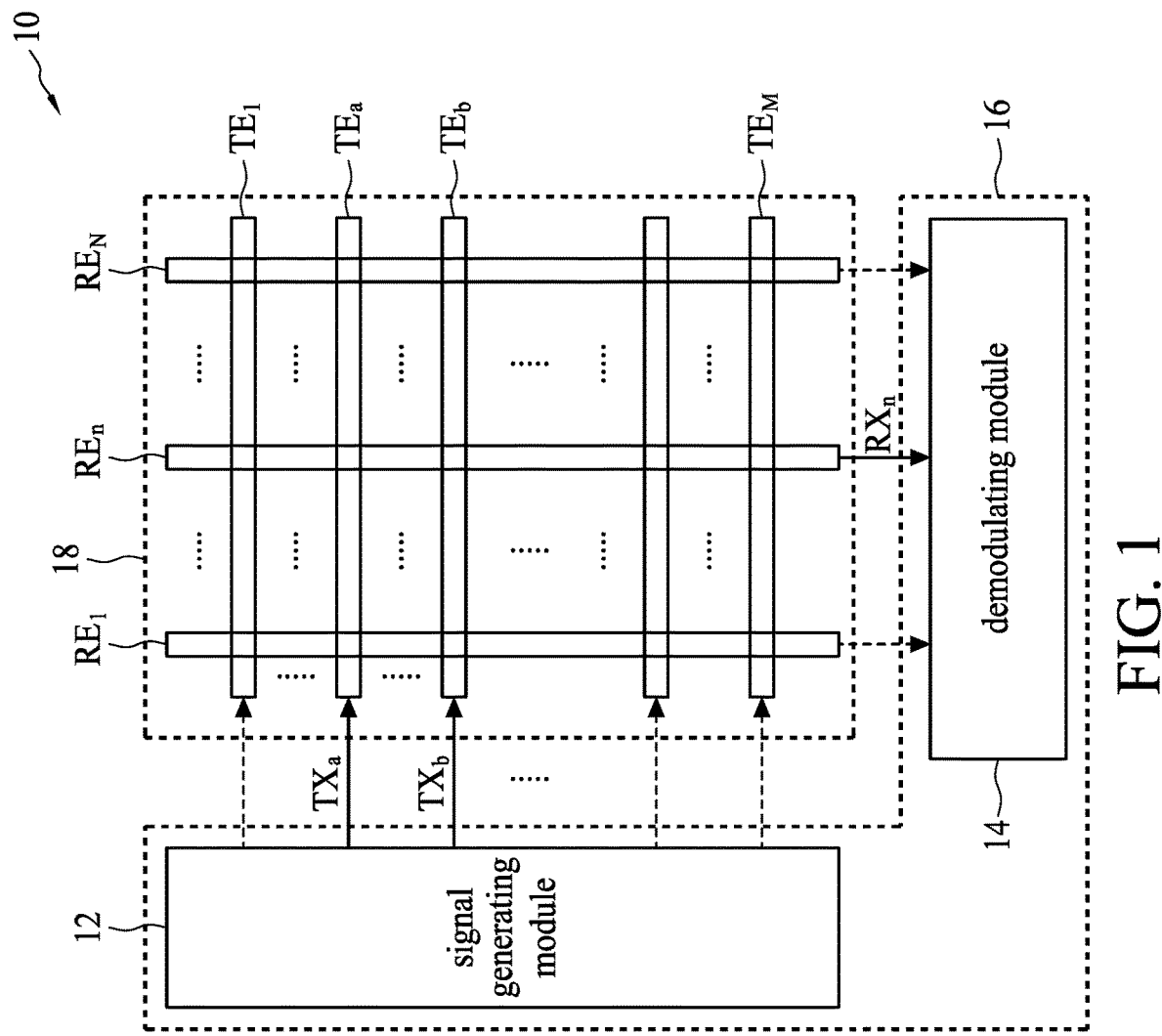
FIG. 1 is a schematic diagramming illustrating a touch system according to embodiments of the present disclosure.

Specifically, reference is made to FIG. 1, which is a schematic diagram illustrating a touch system 10 according to embodiments of the present disclosure. The touch system 10 includes a touch panel 18 and a touch controller 16, wherein the touch panel 18 includes transmit electrodes $TE_1 \sim TE_M$ and receive electrodes $RE_1 \sim RE_N$, and touch controller 16 includes a signal generating module 12 and a demodulating module 14. The signal generating module 12 is coupled to transmit electrodes $TE_1 \sim TE_M$, and the demodulating module 14 is coupled to receive electrodes $RE_1 \sim RE_N$. The transmit electrodes $TE_1 \sim TE_M$ and receive electrodes $RE_1 \sim RE_N$ are arranged on a display screen. The signal generating module 12 can output a first transmitting signal $TX_a$ to a first transmit electrode $TE_a$ of the transmit electrodes $TE_1 \sim TE_M$ and simultaneously output a second transmitting signal $TX_b$ to a second transmit electrode $TE_b$ of the transmit electrodes $TE_1 \sim TE_M$. In this case, the first transmitting signal $TX_a$ and the second transmitting signal $TX_b$ may have signals with the same frequency but with different phases; in other words, the first transmitting signal $TX_a$ may have a frequency $f_c$ and a first phase $\theta_a$, the second transmitting signal $TX_b$, may have a frequency $f_c$ and a second phase $\theta_b$, whereas the first phase $\theta_a$ and the second phase $\theta_b$ are different. The demodulating module 14 may receive a receiving signal from one receive electrode of the receives receive electrodes $RE_1 \sim RE_N$ one by a time in accordance with a specific time sequence. To facilitate the understanding to the present embodiments, the following illustrative discussion is directed to using the demodulating module 14 to receive the receiving signal $RX_n$ from one receive electrode $RE_n$ of the receive electrodes $RE_1 \sim RE_N$; after the demodulating module 14 receives the receiving signal $RX_n$, it performs a demodulation calculation to the receiving signal $RX_n$; that is, it calculates and outputs a first amplitude A corresponding to first phase $\theta_a$ and a second amplitude B corresponding to the second phase $\theta_b$ of the receiving signal $RX_n$, according to receiving signal $RX_n$. In this way, the touch system 10 can determine the capacitance (or a change in the capacitance) between the first transmit electrode $TE_a$ and the receive electrode $RE_n$ (forming a capacitance node) according to the first amplitude A, and determine the capacitance (or a change in the capacitance) between the second transmit electrode $TE_b$ and the receive electrode $RE_n$ according to the second amplitude B determine, so as to determine the location at which a touch event takes place. In one embodiment, the first transmitting signal $TX_a$ can be expressed as $TX_a = \sin(2\pi f_c t + \theta_a)$, and the second transmitting signal $TX_b$ can be expressed as $TX_b = \sin(2\pi f_c t + \theta_b)$. In this case, the demodulating module 14 receives one receiving signal from a receive electrode one at a time in accordance with a sequence order and performs demodulation calculation to the receiving signal; however, the present invention is not limited thereto, the present demodulating module can also receive a plurality of receiving signal from a plurality of receive electrodes during the same operation, and respectively perform demodulation calculation to the plurality of receiving signals; since the principle for respectively demodulating a plurality of receiving signal is the same as demodulating a single receiving signal, the exemplary discussion below is directed to using the demodulating module to receive one receiving signal from a receive electrodes one at a time and performing demodulation calculation to the same.

During a pre-processing stage, the touch controller 16 may obtain information related to the phase of the screen body; that is, obtain the phase information with respect to the transmit electrode and the receive electrode when there is no touch event; and during a touch sensing stage, receives the touch from a user, at this moment, the touch controller 16 uses the demodulating module 14 perform demodulation calculation according to the screen body phase information. Touch system 10 may determine the location at which a touch event takes place according to the result of demodulation calculation. In one embodiment, the operation of obtaining phase information related to the screen body in the pre-processing processing stage may be carried out in advance before the touch system 10 is dispatched from the manufacturing facility or during a calibration stage of the touch system 10.

Specifically, at a first time $T_1$ during the pre-processing stage, the signal generating module 12 only outputs a first transmitting signal $TX_a$ to a first transmit electrode $TE_a$, and the demodulating module 14 receives a receiving signal $RX_{n,1}$ at the first time $T_1$ at the receive electrodes $RE_n$, wherein the receiving signal $RX_{n,1}$ represents the receiving signal $RX_n$ that the demodulating module 14 receives at the receive electrodes $RE_n$ at the first time $T_1$, and the demodulating module 14 generates a first component and a second component of the receiving signal $RX_{n,1}$, and at this time (the first time $T_1$) the first component and the second component of the receiving signal $RX_{n,1}$ is related to the phase between the first transmit electrode $TE_a$ and the receive electrode $RE_n$ (i.e., "the first screen body phase" described herein). At a second time $T_2$ during the pre-processing stage, the signal generating module 12 only outputs a second transmitting signal $TX_b$ to a second transmit electrode $TE_b$, and the demodulating module 14 receives a receiving signal $RX_{n,2}$ at the first time $T_2$ at the receive electrodes $RE_n$, wherein the receiving signal $RX_{n,2}$ represents the receiving signal $RX_n$, that the demodulating module 14 receives at the receive electrodes $RE_n$ at the second time $T_2$, and the demodulating module 14 generates a third component and a fourth component of the receiving signal $RX_{n,2}$, at this time (the second time $T_2$), the third component and the fourth component of the receiving signal $RX_{n,2}$ is related to the phase between the second transmit electrode $TE_b$ and the receive electrode $RE_n$ (i.e., the second screen body phase). During the touch sensing stage (or, at a third time $T_3$), the signal generating module 12 simultaneously outputs the first transmitting signal $TX_a$ to the first transmit electrode $TE_a$ and outputs the second transmitting signal $TX_b$ to the second transmit electrode $TE_b$, and the demodulating module 14 receives a receiving signal $RX_{n,3}$ at the third time $T_3$ at the receive electrodes $RE_n$, wherein the receiving signal $RX_{n,3}$ represents the receiving signal $RX_n$ that the demodulating module 14 receives at the receive electrodes $RE_n$ at the third time $T_3$, and the demodulating module 14 generates a fifth component and a sixth component of the receiving signal $RX_{n,3}$. The demodulating module 14 performs a calculation on the fifth component and the sixth component according to the first component, the second component, the third component and the fourth component, so as to calculate a first amplitude A corresponding to the first phase θ and a second amplitude B corresponding to the second phase $θ_b$ in the receiving signal $RX_{n,3}$ Mathematically, the receiving signal $RX_{n,1}$ can be expressed as $RX_{n,1}=K·\sin(2πf_ct+θ_a+θ_α)$, wherein the first screen body phase $θ_a$ represents the phase between the first transmit electrode $TE_a$ and the receive electrodes $RE_n$; in other words, the screen body phase $θ_a$ is the phase difference between the transmitting signal $TX_a$ (the transmitting signal $TX_a$ is a sinusoidal wave and is in direct proportion to $\sin(2πf_ct+θ_a)$) and the receiving signal $RX_{n,1}$ (the receiving signal $RX_{n,1}$ is a sinusoidal wave and is in direct proportion to $\sin(2πf_ct+θ_a+θ_α)$). Moreover, the receiving signal $RX_{n,2}$ can be expressed as $RX_{n,1}=K \sin(2πf_ct+θ_a+θ_β)$, the second screen body phase $θ_β$ represents the phase between the second transmit electrode $TE_b$ and the receive electrodes $RE_n$ that is, the phase difference between the transmitting signal $TX_b$ (the transmitting signal $TX_b$ is a sinusoidal wave and is in direct proportion to $\sin(2πf_ct+θ_b)$ and the receiving signal $RX_{n,2}$ (the receiving signal $RX_{n,2}$ is a sinusoidal wave and is in direct proportion to $\sin(2πf_ct+θ_b+θ_β)$, wherein K represents the amplitudes of the receiving signals $RX_{n,1}$, $RX_{n,2}$. Furthermore, the receiving signal $RX_{n,3}$ can be expressed as $RX_{n,3}=A \sin(2πf_ct+θ_a+θ_α)+B·\sin(2πf_ct+θ_b+θ_β)$, wherein A and B represent the amplitudes of the receiving signal $RX_{n,3}$ respectively corresponding to phases $θ_a$, $θ_b$.

Figure 2:
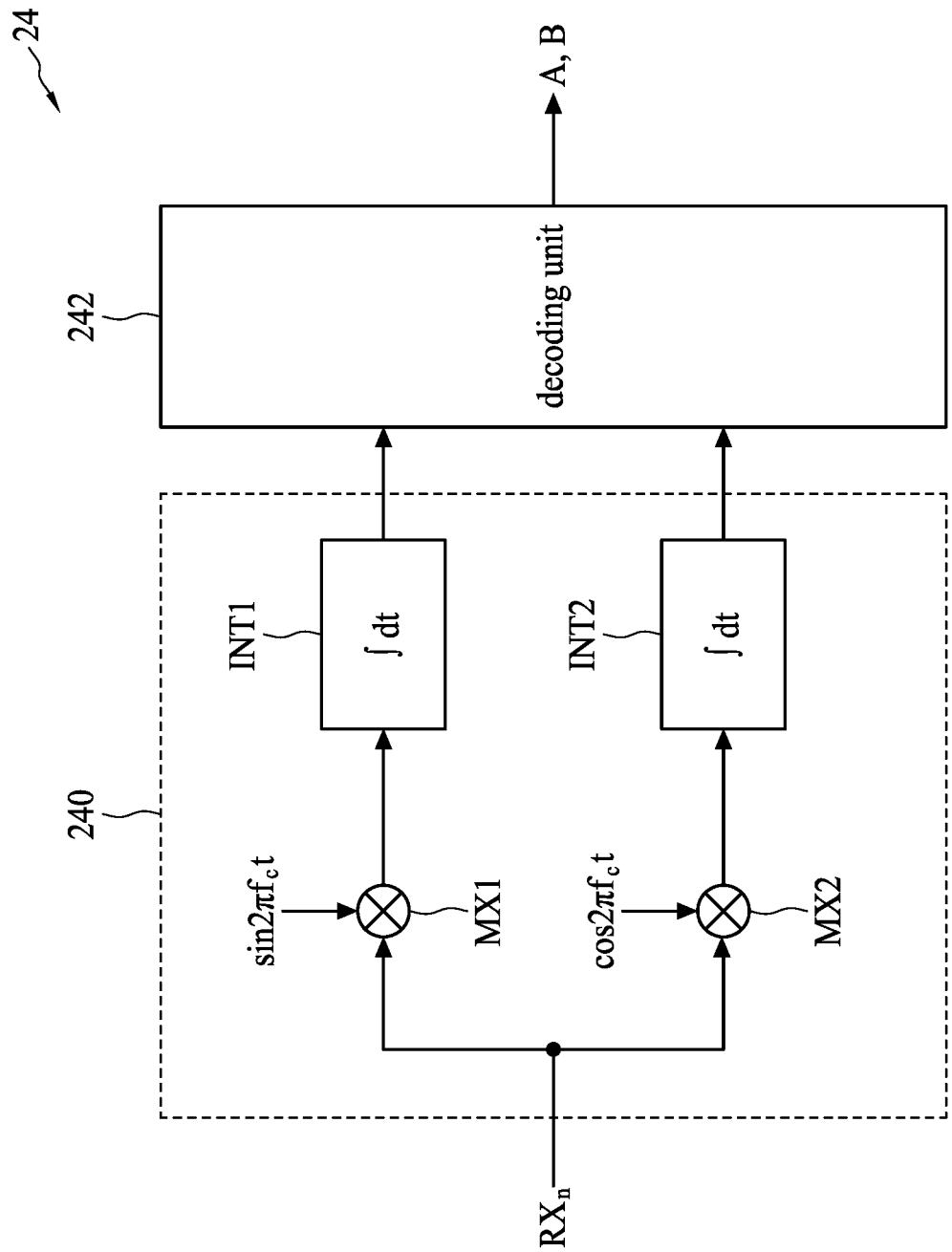
FIG. 2 is a schematic diagramming illustrating a demodulating module according to embodiments of the present disclosure.

Reference is made to FIG. 2, which is a schematic diagram illustrating a demodulating module 24 according to embodiments of the present disclosure. The demodulating module 24 is one specific implementation of the demodulating module 14, wherein the demodulating module 24 includes a mixer-integrator unit 240 and decoding unit 242. The mixer-integrator unit 240 includes mixers MX1, MX2 and integrators INT1, INT2, wherein the mixer MX1 and the integrator INT1 are configured to use a local signal $\sin 2πf_ct$ to performing mixing and integration to the receiving signal $RX_n$, thereby outputting an in-phase component of the receiving signal $RX_n$, whereas the mixer MX2 and the integrator INT2 are configured to use a local signal $\cos 2πf_ct$ to perform mixing and integration to the receiving signal $RX_n$, thereby outputting a quadrature component of the receiving signal $RX_n$.

In this case, the mixer-integrator unit 240 may generate an in-phase component $I_A$ (corresponding to the claimed first component) and a quadrature component $Q_A$ (corresponding to the claimed second component) of the receiving signal an in-phase component $I_B$ (corresponding the claimed third component) and a quadrature component $Q_B$ (corresponding to the claimed fourth component) of the receiving signal $RX_{a,2}$, and an in-phase component $I_C$ (corresponding to the claimed fifth component) and a quadrature component $Q_C$ (corresponding to the claimed sixth component) of the receiving signal $RX_{a,3}$. In one embodiment, the in-phase component $I_A$ can be expressed as $I_A=(KT/2)\cos(θ_a+θ_α)$, wherein T represents the integration intervals of integrators INT1, INT2, the quadrature component $Q_A$ can be expressed as $Q_A=(KT/2)\sin(θ_a+θ_α)$, the in-phase component $I_B$ can be expressed as $I_B=(KT/2)\cos(θ_b+θ_β)$, the quadrature component $Q_B$ can be expressed as $Q_B=(KT/2)\sin(θ_b+θ_β)$, the in-phase component $I_C$ can be expressed as $(AT/2)\cos(θ_a+θ_α)+(BT/2)\cos(θ_b+θ_β)$ (Equation 1), and the quadrature component $Q_C$ can be expressed as $Q_C=(AT/2)\sin(θ_a+θ_α)+(BT/2)\sin(θ_b+θ_β)$ (Equation 2).

In the first embodiments, the decoding unit 242 may first calculate $θ_a+θ_α$ using $θ_a+θ_α=\tan^{-1}(Q_A/I_A)$ (Equation 3) and then get that $θ_b+θ_β=\tan^{-1}(Q_B/I_B)$ (Equation 4), in other words, the decoding unit 242 calculate the first receiving phase angle $θ_A$ between first transmit electrode $TE_a$ and the receive electrode $RE_n$ according to the in-phase component $I_A$ (the first component) and the quadrature component $Q_A$ (the second component), and calculate the second receiving phase angle $θ_B$ between the second transmit electrode $TE_b$ and the receive electrode $RE_n$ according to the in-phase component $I_B$ (the third component) and quadrature component $Q_B$ (the fourth component), wherein $θ_A$ is $θ_A=θ_a+θ_α$, and $θ_B$ is $θ_B=θ_b+θ_β$. At the same time, the decoding unit 242 may form a first coordinate ($I_C$, $Q_C$) using the in-phase component $I_C$ (the fifth component) and the quadrature component $Q_C$ (the sixth component), wherein $I_C$ can be considered as a component of the first coordinate ($I_C$, $Q_C$) in a horizontal dimension, $Q_C$ can be considered as a component of the first coordinate ($I_C$, $Q_C$) in a vertical dimension.

The decoding unit 242 may perform a coordinate rotation calculation to the first coordinate ($I_C$, $Q_C$) with respect to the second receiving phase angle $θ_B$, thereby obtaining a second coordinate ($I_C^{(2)}$, $Q_C^{(2)}$), and obtain the first amplitude A according to the component $Q_C^{(2)}$ of the second coordinate ($I_C^{(2)}$, $Q_C^{(2)}$) in the vertical dimension (corresponding to the claimed seventh component). On the other hand, the decoding unit 242 may perform a coordinate rotation calculation to the first coordinate ($I_C$, $Q_C$) with respect to the first receiving phase angle $θ_A$, thereby obtaining a third coordinate ($I_C^{(3)}$, $Q_C^{(3)}$), and obtain the second amplitude B according to the component $I_C^{(3)}$ of the third coordinate ($I_C^{(3)}$, $Q_C^{(3)}$) in the horizontal dimension (corresponding to the claimed eighth component).

Figure 3:
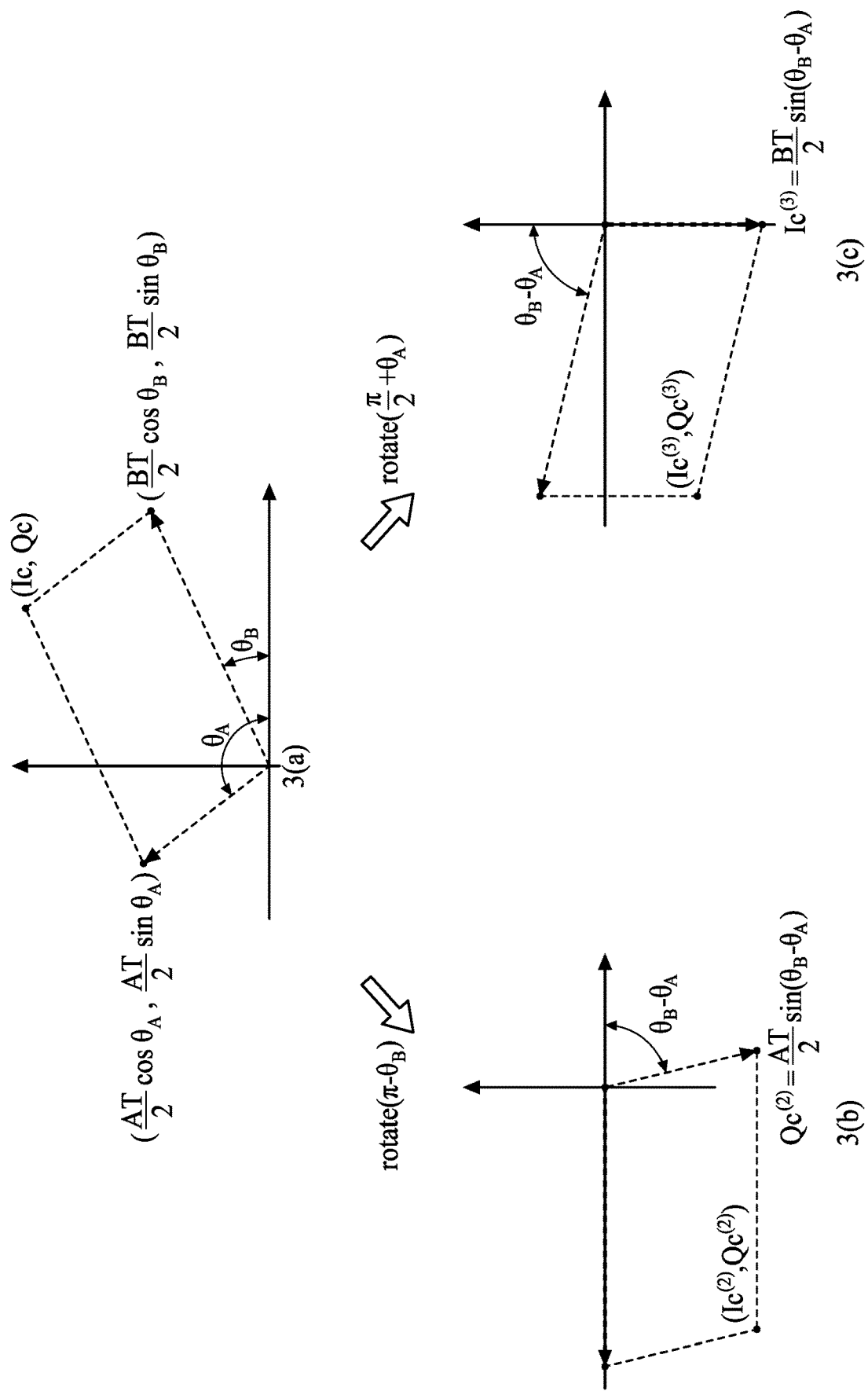
FIG. 3 is a schematic diagramming illustrating a plurality of coordinate according to embodiments of the present disclosure.

Specifically, reference is made to FIG. 3, which is a schematic diagram illustrating that the first coordinate ($I_C$, $Q_C$), the second coordinate ($I_C^{(2)}$, $Q_C^{(2)}$) and the third coordinate ($I_C^{(3)}$, $Q_C^{(3)}$) are in a coordinate plane. As shown in panel 3(a), since the in-phase component $I_C$ and the quadrature component $Q_C$ can be expressed as Equation 1 and Equation 2, the first coordinate ($I_C$, $Q_C$) may be considered as the sum pf a vector ($V_A(AT/2)\cos θ_A$, $(AT/2)\sin θ_A$) and another vector $V_B$, wherein, as shown in panel 3(a) in FIG. 3, the vector $V_A$ can be expressed as (($AT/2)\cos θ_A$, $(AT/2)\sin θ_A$), the vector $V_B$ can be expressed as (($BT/2)\cos θ_B$, $(BT/2)\sin θ_B$). As shown in panel 3(b), after the decoding unit 242 performs a counter-clockwise rotation by ($π-θ_B$) to the first coordinate ($I_C$, $Q_C$), the vector $V_B$ in panel 3(a) overlaps with the horizontal dimension, and hence, for the second coordinate ($I_C^{(2)}$, $Q_C^{(2)}$) that is obtained by counter-clockwise rotation of the first coordinate ($I_C$, $Q_C$) by ($π-θ_B$), the vertical dimension component $Q_C^{(2)}$ can be expressed as $(AT/2)\sin(θ_B-θ_A)$; accordingly, the decoding unit 242 may obtain the first amplitude A according to the component $Q_C^{(2)}$. On the other hand, as shown in panel 3(c), after the decoding unit 242 performs a clockwise rotation by ($π/2+θ_A$) to the first coordinate ($I_C$, $Q_C$), the vector $V_A$ in panel 3(a) overlaps with the vertical dimension, and hence, for the third coordinate ($I_C^{(3)}$, $Q_C^{(3)}$) that is obtained by clockwise rotation of the first coordinate ($I_C$, $Q_C$) by ($π/2+θ_A$), the horizontal dimension component $I_C^{(3)}$ can be expressed as $(BT/2)\sin(θ_B-θ_A)$; accordingly, the decoding unit 242 may obtain the second amplitude B according to component $I_C^{(3)}$. In this case, the horizontal dimension and the vertical dimension are mutually orthogonal.

Preferably, the signal generating module 12 may adjust phases $\theta_a$, $\theta_b$ so that $\theta_B-\theta_A=\pi/2$; in this way, the component $Q_C^{(2)}$ is expressed as $Q_C^{(2)}=AT/2$, and the component $I_C^{(3)}$ is expressed as $I_C^{(3)}=BT/2$; since the integration interval T is known, the decoding unit 242 may obtain amplitudes A, B according to components $Q_C^{(2)}$, $I_C^{(3)}$.

In one embodiment, the decoding unit 242 may includes a coordinate rotation digital computer (CORDIC) 2420; as shown in FIG. 4, the CORDIC 2420 is configured to perform the calculation of a coordinate rotation digital computer algorithm (CORDIC algorithm), and the decoding unit 242 may use the CORDIC algorithm of the CORDIC 2420 to perform the calculation of Equation 3 and Equation 4 (i.e., the calculation of the $\tan^{-1}$ function). The details for calculating the $\tan^{-1}$ function using the CORDIC algorithm are known to persons having ordinary skill in the art, and hence, is not discussed herein for the sake of brevity.

On the other hand, the CORDIC 2420 may use the CORDIC algorithm to perform the counter-clockwise rotation by $(\pi-\theta_B)$ to the first coordinate ($I_C$, $Q_C$), thereby obtaining the second coordinate ($I_C^{(2)}$, $Q_C^{(2)}$), and obtain the component $Q_C^{(2)}$ from the second coordinate ($I_C^{(2)}$, $Q_C^{(2)}$); moreover, the CORDIC 2420 may use the CORDIC algorithm to perform clockwise rotation by $(\pi/2+\theta_A)$ to the first coordinate ($I_C$, $Q_C$), thereby obtaining the third coordinate ($I_C^{(3)}$, $Q_C^{(3)}$), and obtain the component $I_C^{(3)}$ from the third coordinate ($I_C^{(3)}$, $Q_C^{(3)}$). In other words, the CORDIC 2420 may be used repetitively, without the use of additional circuits, thereby reducing the circuit area. The details for performing the coordinate rotation to specific coordinates with specific angles using the CORDIC algorithm are known to persons having ordinary skill in the art, and hence, is not discussed herein for the sake of brevity.

Further, the decoding unit 242 is not limited to perform the calculation of the $\tan^{-1}$ function or the calculation of the coordinate rotation. In a second embodiment, the decoding unit 242 may, according to the in-phase component $I_A$ (the first component), the quadrature component $Q_A$ (the second component), the in-phase component $I_B$ (the third component) and the quadrature component $Q_B$ (the fourth component), form a decoding matrix D, form a first vector $v_1$ (wherein the first vector $v_1$ can be expressed as $v_1=[I_C Q_C]^T$) from the in-phase component $I_C$ (the fifth component) and quadrature component $Q_C$ (the sixth component), and multiply the decoding matrix D with the first vector $v_1$, thereby obtaining a second vector $v_2$. Specifically, the decoding unit 242 may form the decoding matrix D which is expressed as Equation 5, and perform the calculation of $v_2=Dv_1$, according to the inference from Equation 6 (wherein $\theta_A=\theta_a+\theta_\alpha$, $\theta_B=\theta_b+\theta_\beta$), the decoding unit 242 may obtain amplitudes A, B according to the second vector $v_2$.

$$D = \begin{bmatrix} Q_B & -I_B \\ -Q_A & I_A \end{bmatrix} \quad \text{(Equation 5)}$$

$$v_2 = Dv_1 = (KT/2) \cdot \begin{bmatrix} \sin\theta_B & -\cos\theta_B \\ -\sin\theta_A & \cos\theta_A \end{bmatrix} \quad \text{(Equation 6)}$$

$$\begin{bmatrix} (AT/2)\cdot\cos\theta_A + (BT/2)\cdot\cos\theta_B \\ (AT/2)\cdot\cos\theta_A + (BT/2)\cdot\cos\theta_B \end{bmatrix} =$$

$$(KT/2) \cdot \sin(\theta_B - \theta_A) \cdot \begin{bmatrix} AT/2 \\ BT/2 \end{bmatrix}$$

The operation process of the touch controller 16 may be summarized as a process 50; as shown in FIG. 5, the process 50 includes the steps as follows.

Step 502: using the signal generating module 12 to output the first transmitting signal $TX_a$ to the first transmit electrode $TE_a$ and simultaneously output the second transmitting signal $TX_b$ to the second transmit electrode $TE_b$, wherein the first transmitting signal $TX_a$ has the first phase $\theta_a$, the second transmitting signal $TX_b$ has the second phase $\theta_b$, wherein the first phase and the second phase are different.

Step 504: using the demodulating module 14 to receive the receiving signal $RX_n$ of the receive electrodes $RE_n$, and to calculate the first amplitude A corresponding to first phase $\theta_a$ and the second amplitude B corresponding to the second phase $\theta_b$ in the receiving signal $RX_n$.

Details of the process 50 are described in the foregoing paragraphs, and hence are omitted herein.

It should be noted that the foregoing embodiments are provided to elucidate the concepts of the present invention, and persons having ordinary skill in the art may make various modifications to such embodiments; however, the present invention is not limited thereto. For example, the demodulating module 24 shown in FIG. 2 is configured to perform orthogonal demodulation to and to receive the receiving signal $RX_n$; that is, mixers MX1, MX2 respectively perform mixing using the mutually orthogonal local signals $\sin 2\pi f_c t$, $\cos 2\pi f_c t$ to the receiving signal $RX_n$, whereas the mixer MX1 uses the local signal to perform mixing to the receiving signal $RX_n$; however, the present invention is not limited thereto.

Figure 6:
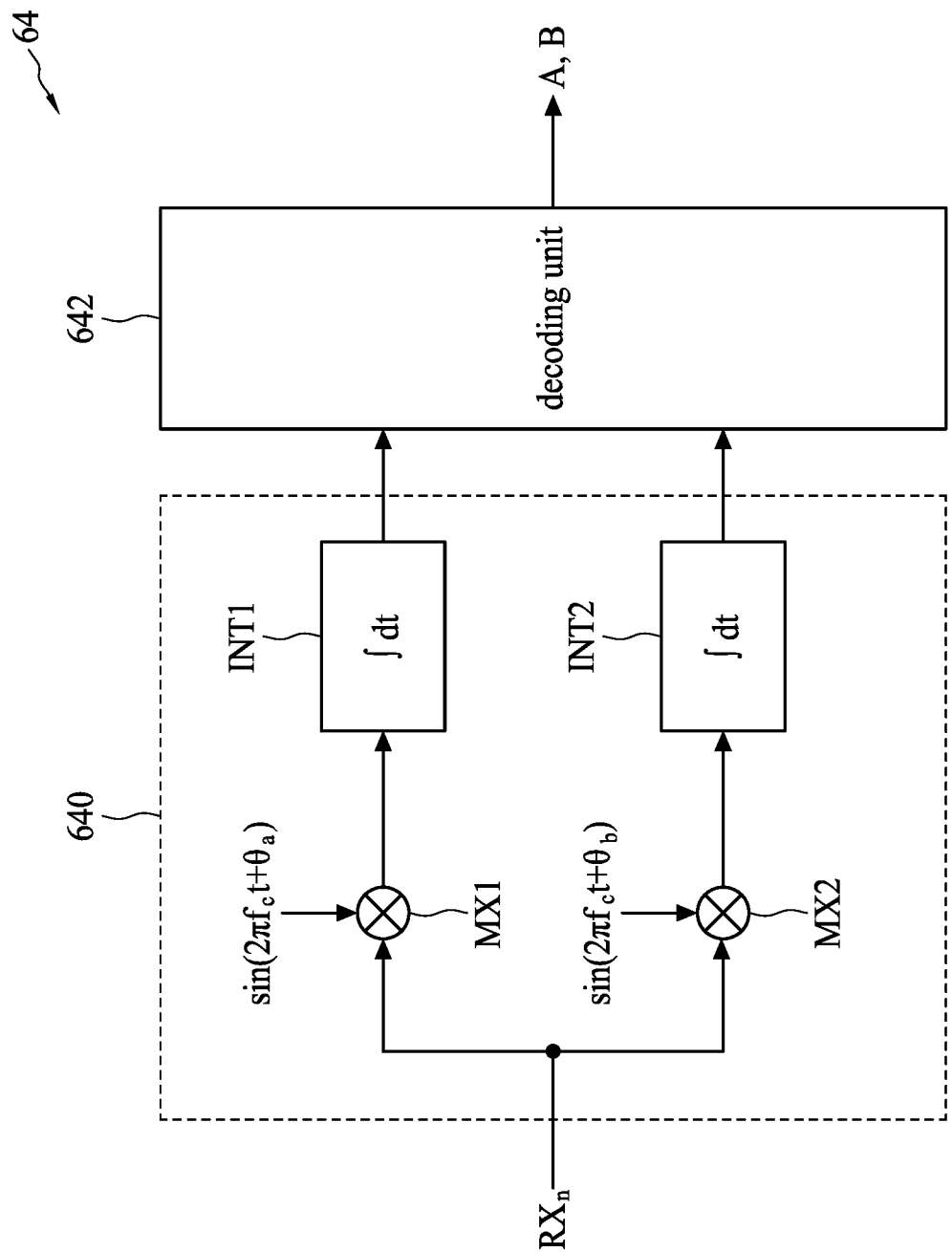
FIG. 6 is a schematic diagramming illustrating a demodulating module according to embodiments of the present disclosure.
Figure 7:
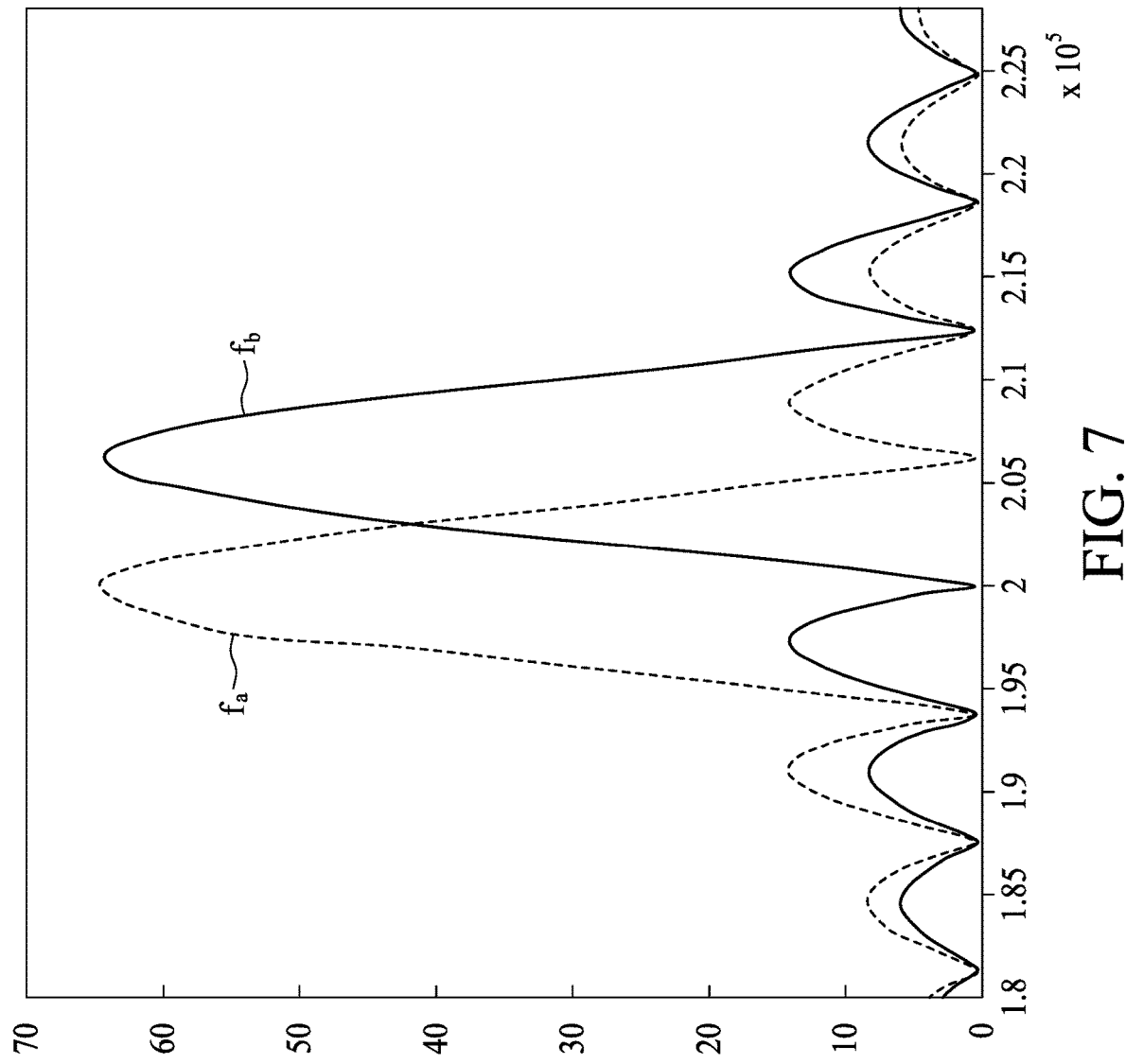
FIG. 7 shows a spectrum of two mutually orthogonal signals.

Reference is made to FIG. 6, which is a schematic diagram illustrating a demodulating module 64 according to one embodiment of the present disclosure. The demodulating module 64 is also a specific implementation of the demodulating module 14, wherein the demodulating module 64 and the demodulating module 24 are similar, and hence, the same elements may be indicated with the same reference numeral or symbol. The demodulating module 64 is different from the demodulating module 24 in that the demodulating module 64 (i.e., the mixers MX1, MX2) uses local signals $\sin(2\pi f_c t+\theta_a)$, $\sin(2\pi f_c t+\theta_b)$ that are not mutually orthogonal to perform mixing to the receiving signal $RX_n$. In this case, when the phase difference between the local signals $\sin(2\pi f_c t+\theta_a)$, $\sin(2\pi f_c t+\theta_b)$ is an integral multiple of 90°, the local signals $\sin(2\pi f_c t+\theta_a)$, $\sin(2\pi f_c t+\theta_b)$ are orthogonal; whereas when the phase difference between local signals $\sin(2\pi f_c t+\theta_a)$, $\sin(2\pi f_c t+\theta_b)$ is not an integral multiple of 90°, the local signals $\sin(2\pi f_c t+\theta_a)$, $\sin(2\pi f_c t+\theta_b)$ are not orthogonal. In other words, the phase difference between local signals $\sin(2\pi f_c t+\theta_a)$, $\sin(2\pi f_c t+\theta_b)$ (those used by mixers MX1, MX2 of the demodulating module 64) is not an integral multiple of 90°; for example, the phase difference between local signals $\sin(2\pi f_c t+\theta_a)$, $\sin(2\pi f_c t+\theta_b)$ is greater than 0° and less than 90°, and when the phase difference between local signals $\sin(2\pi f_c t+\theta_a)$, $\sin(2\pi f_c t+\theta_b)$ is greater than 0° and less than 90°, local signals $\sin(2\pi f_c t+\theta_a)$, $\sin(2\pi f_c t+\theta_b)$ are not orthogonal signals.

Specifically, the mixer MX1 and integrator INT1 in the mixer-integrator unit 640 of the demodulating module 64 may generate a first component $I_A'$ of the receiving signal $RX_{n,1}$, and the mixer MX2 and integrator INT2 may generate a second component $Q_A'$ of the receiving signal $RX_{n,1}$, wherein the first component $I_A'$ is a component of the receiving signal $RX_{n,1}$ corresponding to the first phase $\theta_a$ and can be expressed as $I_A'=(KT/2)\cos\theta_a$, whereas the second component $Q_A'$ is a component of the receiving signal $RX_{n,1}$ corresponding to the second phase $\theta_b$ and can be expressed as $Q_A'=(KT/2)\sin(\theta_a+\theta_\alpha-\theta_b)$. Further, the mixer MX1 and integrator INT1 of the mixer-integrator unit 340 may generate a third component $I_B'$ of the receiving signal $RX_{n,2}$, and the mixer MX2 and integrator INT2 may generate a fourth component $Q_B'$ of the receiving signal $RX_{n,2}$, wherein the third component $I_B'$ is the component of the receiving signal $RX_{n,2}$ corresponding to first phase $\theta_a$ and can be expressed as $I_B'=(KT/2)\cos(\theta_b+\theta_\beta-\theta_a)$, whereas the fourth component $Q_B'$ is the component of the receiving signal $RX_{n,2}$ corresponding to the second phase $\theta_b$ and can be expressed as $Q_B'=(KT/2)\cos\theta_\beta$. Further, the mixer MX1 and integrator INT1. In the mixer-integrator unit 340 may generate a fifth component $I_C'$ of the receiving signal $RX_{n,3}$, and the mixer MX2 and integrator INT2 may generate a sixth component $Q_C'$ of the receiving signal $RX_{n,3}$, wherein the fifth component $I_C'$ is the component of the receiving signal $RX_{n,3}$ corresponding to first phase $\theta_a$ and can be expressed as $I_C'=(AT/2)\cos\theta_a+(BT/2)\cos(\theta_b+\theta_\beta-\theta_a)$, whereas the sixth component $Q_C'$ is the component of the receiving signal $RX_{n,3}$ corresponding to the second phase $\theta_b$ and can be expressed as $Q_C'=(AT/2)\cos(\theta_a+\theta_\alpha-\theta_b)+(BT/2)\cos\theta_\beta$. Since the relationship among the first component $I_A'$, the second component $Q_A'$, the third component $I_B'$, the fourth component $Q_B'$, the fifth component $I_C'$ and the sixth component $Q_C'$ is shown in Equation 7, the decoding unit 642 of the demodulating module 64 may operate like the decoding unit 242 to calculate the first amplitude A corresponding to the first phase $\theta_a$ and the second amplitude B corresponding to the second phase $\theta_b$ in the receiving signal $RX_{n,3}$.

$$\begin{bmatrix} Q_B' & -I_B' \\ -Q_A' & I_A' \end{bmatrix} \begin{bmatrix} I_C' \\ Q_C' \end{bmatrix} = (KT/2)\cdot\sin(\theta_B-\theta_A)\cdot\sin(\theta_a-\theta_b)\begin{bmatrix} AT/2 \\ BT/2 \end{bmatrix} \quad \text{(Equation 7)}$$

In view of the foregoing, the present disclosure uses a CORDIC or a decoding matrix to demodulate a first transmitting signal and a second transmitting signal having the same frequency but different phases, so as to calculate the amplitudes corresponding to different phases to determine the coordinate at which a touch event takes place. As compared with conventional arts, the present disclosure has the advantage of reduced bandwidth.

The foregoing outlines only some preferred embodiments the present invention, and shall not be construed to limit the present invention; any change, equivalent substitution and improvement made within the spirit and principle according to the present invention are comprised in the scope of the present disclosure.

What is claimed is:

1. A touch controller, comprising:
   a signal generating module, coupled to a plurality of transmit electrodes of a touch panel, and configured to output a first transmitting signal to a first transmit electrode of the plurality of transmit electrodes and simultaneously output a second transmitting signal to a second transmit electrode of the plurality of transmit electrodes during a touch sensing stage, wherein the first transmitting signal has a first phase, and the second transmitting signal has a second phase different from the first phase; and
   a demodulating module, coupled to a plurality of receive electrodes of the touch panel, and configured to receive a receiving signal at a receive electrode of the plurality of receive electrodes, and during the touch sensing stage, according to the receiving signal, calculate a first amplitude corresponding to the first phase and a second amplitude corresponding to the second phase of the receiving signal;
   wherein, the first amplitude is configured to determine a capacitance between the first transmit electrode and the receive electrode, and the second amplitude is configured to determine a capacitance between the second transmit electrode and the receive electrode; and
   during a pre-processing stage, the signal generating module outputs the first transmitting signal to the first transmit electrode and not outputs any signal to the plurality of the transmit electrodes except the first transmit electrode at a first time, and the demodulating module receives a first receiving signal at the receive electrode of the plurality of receive electrodes at the first time and generates a first component and a second component corresponding to the first receiving signal, wherein the first component and the second component relate to a phase between the first transmitting signal output to the first transmit electrode and the first receiving signal received at the receive electrode; the signal generating module outputs the second transmitting signal to the second transmit electrode and not outputs any signal to the plurality of the transmit electrodes except the second transmit electrode at a second time, and the demodulating module receives a second receiving signal at the receive electrode at the second time and generates a third component and a fourth component corresponding to the second receiving signal, wherein the third component and the fourth component relate to a phase between the second transmitting signal output to the second transmit electrode and the second receiving signal received at the receive electrode.

2. The touch controller of claim 1, wherein during the touch sensing stage:
   the signal generating module outputs the first transmitting signal having a first phase to the first transmit electrode at a third time and simultaneously outputs the second transmitting signal having a second phase different from the first phase to the second transmit electrode, and the demodulating module receives a third receiving signal at the receive electrode at the third time and generates a fifth component and a sixth component corresponding to the third receiving signal; and the demodulating module performs a calculation to the fifth component and the sixth component according to the first component, the second component, the third component and the fourth component, to calculate the first amplitude corresponding to the first phase and the second amplitude corresponding to the second phase of the third receiving signal.

3. The touch controller of claim 2, wherein the demodulating module is configured to perform the following steps, so as to perform the calculation to the fifth component and the sixth component according to the first component, the second component, the third component and the fourth component, to calculate the first amplitude corresponding to the first phase and the second amplitude corresponding to the second phase of the third receiving signal:
   calculating a first receiving phase angle between the first transmit electrode and the receive electrode according to the first component and the second component;
   calculating a second receiving phase angle between the second transmit electrode and the receive electrode according to the third component and the fourth component;

performing a coordinate rotation calculation to a first coordinate with respect to the second receiving phase angle, thereby obtaining a seventh component of a second coordinate, wherein the first coordinate is formed from the fifth component and the sixth component, and the seventh component is the component of the second coordinate in a first dimension;

performing a coordinate rotation calculation to the first coordinate with respect to the first receiving phase angle, thereby obtaining an eighth component of a third coordinate, wherein the eighth component is the component of the third coordinate in a second dimension, and the first dimension and the second dimension are orthogonal; and obtaining the first amplitude according to the seventh component, and obtaining the second amplitude according to the eighth component.

4. The touch controller of claim 3, wherein the demodulating module comprises:

a coordinate rotation digital computer (CORDIC), configured to use a CORDIC algorithm to perform the following steps:

calculating the first receiving phase angle according to the first component and the second component;

calculating the second receiving phase angle according to the third component and the fourth component;

performing the coordinate rotation calculation to the first coordinate with respect to the second receiving phase angle, thereby obtaining the seventh component of the second coordinate; and performing the coordinate rotation calculation to the first coordinate with respect to the first receiving phase angle, thereby obtaining the eighth component of the third coordinate.

5. The touch controller of claim 2, wherein the demodulating module is configured to perform the following steps to perform the calculation to the fifth component and the sixth component according to the first component, the second component, the third component and the fourth component, to calculate the first amplitude corresponding to the first phase and the second amplitude corresponding to the second phase of the third receiving signal:

forming a decoding matrix according to the first component, the second component, the third component and the fourth component;

forming a first vector according to the fifth component and the sixth component;

multiplying the decoding matrix with the first vector, thereby obtaining a second vector; and obtaining the first amplitude and the second amplitude according to the second vector.

6. The touch controller of claim 5, wherein the decoding matrix is in direct proportion to $$\begin{bmatrix} Q_B & -I_B \\ -Q_A & I_A \end{bmatrix},$$

wherein $I_A$ represents the first component, $Q_A$ represents the second component, $I_B$ represents the third component, and $Q_B$ represents the fourth component.

7. The touch controller of claim 2, wherein the first component is an in-phase component of the first receiving signal, the third component is an in-phase component of the second receiving signal, the fifth component is an in-phase component of the third receiving signal, the second component is an quadrature component of the first receiving signal, the fourth component is an quadrature component of the second receiving signal, and the sixth component is an quadrature component of the third receiving signal.

8. The touch controller of claim 2, wherein the first component is the component of the first receiving signal corresponding to the first phase, the third component is the component of the second receiving signal corresponding to the first phase, the fifth component is the component of the third receiving signal corresponding to the first phase, the second component is the component of the first receiving signal corresponding to the second phase, the fourth component is the component of the second receiving signal corresponding to the second phase, and the sixth component is the component of the third receiving signal corresponding to the second phase.

9. A demodulation method for use in a touch controller of a touch system, wherein the touch controller includes a signal generating module and a demodulating module, and the demodulation method comprises:

during a pre-processing stage, using the signal generating module to output a first transmitting signal to a first transmit electrode of a plurality of transmit electrodes of a touch panel and not output any signal to the plurality of the transmit electrodes except the first transmit electrode at a first time;

using the demodulating module to receive a first receiving signal at a receive electrode of a plurality of receive electrodes of the touch panel at the first time and generate a first component and a second component corresponding to the first receiving signal, wherein the first component and the second component relate to a phase between the first transmitting signal and the first receiving signal;

using the signal generating module to output a second transmitting signal to a second transmit electrode of the plurality of transmit electrodes and not output any signal to the plurality of the transmit electrodes except the second transmit electrode at a second time; and using the demodulating module to receive a second receiving signal at the receive electrode at the second time, and generate a third component and a fourth component corresponding to the second receiving signal, wherein the third component and the fourth component relate to a phase between the second transmitting signal and the second receiving signal.

10. The demodulation method of claim 9, further comprising:

during a touch sensing stage, using the signal generating module to output the first transmitting signal having a first phase to the first transmit electrode at a third time and simultaneously output the second transmitting signal having a second phase different from the first phase to the second transmit electrode;

using the demodulating module to receive a third receiving signal at the receive electrode at the third time and generate a fifth component and a sixth component corresponding to the third receiving signal ($Q_C$); and using the demodulating module to perform a calculation to the fifth component and the sixth component according to the first component, the second component, the third component and the fourth component, to calculate the first amplitude corresponding to the first phase and the second amplitude corresponding to the second phase of the third receiving signal.

11. The demodulation method of claim 10, wherein the step of performing the calculation to the fifth component and the sixth component according to the first component, the second component, the third component and the fourth component, to calculate the first amplitude corresponding to the first phase and the second amplitude corresponding to the second phase of the third receiving signal comprises:
  calculating a first receiving phase angle between the first transmit electrode and the receive electrode according to the first component and the second component;
  calculating a second receiving phase angle between the second transmit electrode and the receive electrode according to the third component and the fourth component;
  forming a first coordinate using the fifth component and the sixth component;
  performing a coordinate rotation calculation to the first coordinate with respect to the second receiving phase angle, thereby obtaining a seventh component of a second coordinate;
  performing a coordinate rotation calculation to the first coordinate with respect to the first receiving phase angle, thereby obtaining an eighth component of a third coordinate; and
  obtaining the first amplitude according to the seventh component, and obtaining the second amplitude according to the eighth component.

12. The demodulation method of claim 11, wherein the step of performing the calculation to the fifth component and the sixth component according to the first component, the second component, the third component and the fourth component, to calculate the first amplitude corresponding to the first phase and the second amplitude corresponding to the second phase of the third receiving signal comprises:
  using a coordinate rotation digital computer (CORDIC) algorithm to calculate the first receiving phase angle between the first transmit electrode and the receive electrode according to the first component and the second component;
  using the CORDIC algorithm to calculate the second receiving phase angle between the second transmit electrode and the receive electrode according to the third component and the fourth component;
  using the CORDIC algorithm to perform the coordinate rotation calculation to the first coordinate with respect to the second receiving phase angle, thereby obtaining the seventh component of the second coordinate; and
  using the CORDIC algorithm to perform the coordinate rotation calculation to the first coordinate with respect to the first receiving phase angle, thereby obtaining the eighth component of the third coordinate.

13. The demodulation method of claim 10, wherein the step of performing the calculation to the fifth component and the sixth component according to the first component, the second component, the third component and the fourth component, to calculate the first amplitude corresponding to the first phase and the second amplitude corresponding to the second phase of the third receiving signal comprises:
  forming a decoding matrix according to the first component, the second component, the third component and the fourth component:
    forming a first vector according to the fifth component and the sixth component;
    multiplying the decoding matrix with the first vector, thereby obtaining a second vector; and
    obtaining the first amplitude and the second amplitude according to the second vector.

14. The demodulation method of claim 13, wherein the decoding matrix is in direct proportion to $$\begin{bmatrix} Q_B & -I_B \\ -Q_A & I_A \end{bmatrix},$$

wherein $I_A$ represents the first component, $Q_A$ represents the second component, $I_B$ represents the third component, and $Q_B$ represents the fourth component.

15. The demodulation method of claim 10, wherein the first component is an in-phase component of the first receiving signal, the third component is an in-phase component of the second receiving signal, the fifth component is an in-phase component of the third receiving signal, the second component is an quadrature component of the first receiving signal, the fourth component is an quadrature component of the second receiving signal, and the sixth component is an quadrature component of the third receiving signal.

16. The demodulation method of claim 10, wherein the first component is the component of the first receiving signal corresponding to the first phase, the third component is the component of the second receiving signal corresponding to the first phase, the fifth component is the component of the third receiving signal corresponding to the first phase, the second component is the component of the first receiving signal corresponding to the second phase, the fourth component is the component of the second receiving signal corresponding to the second phase, and the sixth component is the component of the third receiving signal corresponding to the second phase.

17. A touch system, comprising:
  a touch panel, comprising:
    a plurality of transmit electrodes; and
    a plurality of receive electrodes; and
  a touch controller, wherein the touch controller comprises:
    a signal generating module, coupled to a plurality of transmit electrodes of a touch panel, and configured to output a first transmitting signal to a first transmit electrode of the plurality of transmit electrodes and a second transmitting signal to a second transmit electrode of the plurality of transmit electrodes; and
    a demodulating module, coupled to a plurality of receive electrodes of the touch panel, and configured to receive a receiving signal at a receive electrode of the plurality of receive electrodes;
  wherein during a pre-processing stage:
    the signal generating module outputs the first transmitting signal to the first transmit electrodes and not outputs any signal to the plurality of the transmit electrodes except the first transmit electrode at a first time, and the demodulating module receives a first receiving signal at the receive electrode of the plurality of receive electrodes at the first time and generates a first component and a second component corresponding to the first receiving signal, wherein the first component and the second component relate to a phase between the first transmitting signal and the first receiving signal; the signal generating module outputs the second transmitting signal to the second transmit electrode and not outputs any signal to the plurality of the transmit electrodes except the second transmit electrode at a second time, and the demodulating module receives a second receiving signal at the receive electrode at the second time and generates a third component and a fourth component corresponding to the second receiving signal, wherein the third component and the fourth component relate to a phase between the second transmitting signal and the second receiving signal.

18. The touch system of claim 17, wherein during a touch sensing stage:
the signal generating module outputs the first transmitting signal having a first phase to the first transmit electrode at a third time and simultaneously outputs the second transmitting signal having a second phase different from the first phase to the second transmit electrode, and the demodulating module receives a third receiving signal at the receive electrode at the third time and generates a fifth component and a sixth component corresponding to the third receiving signal; and the demodulating module performs a calculation to the fifth component and the sixth component according to the first component, the second component, the third component and the fourth component, to calculate the first amplitude corresponding to the first phase and the second amplitude corresponding to the second phase of the third receiving signal.

19. The touch system of claim 18, wherein the demodulating module is configured to perform the following steps, so as to perform the calculation to the fifth component and the sixth component according to the first component, the second component, the third component and the fourth component, to calculate the first amplitude corresponding to the first phase and the second amplitude corresponding to the second phase of the third receiving signal:
calculating a first receiving phase angle between the first transmit electrode and the receive electrode according to the first component and the second component;
calculating a second receiving phase angle between the second transmit electrode and the receive electrode according to the third component and the fourth component;
performing a coordinate rotation calculation to a first coordinate with respect to the second receiving phase angle, thereby obtaining a seventh component of a second coordinate, wherein the first coordinate is formed from the fifth component and the sixth component, and the seventh component is the component of the second coordinate in a first dimension;
performing a coordinate rotation calculation to the first coordinate with respect to the first receiving phase angle, thereby obtaining an eighth component of a third coordinate, wherein the eighth component is the component of the third coordinate in a second dimension, and the first dimension and the second dimension are orthogonal; and
obtaining the first amplitude according to the seventh component, and obtaining the second amplitude according to the eighth component.

20. The touch system of claim 19, wherein the demodulating module comprises:
a coordinate rotation digital computer (CORDIC), configured to use a CORDIC algorithm to perform the following steps:
calculating the first receiving phase angle according to the first component and the second component;
calculating the second receiving phase angle according to the third component and the fourth component;
performing the coordinate rotation calculation to the first coordinate with respect to the second receiving phase angle, thereby obtaining the seventh component of the second coordinate; and
performing the coordinate rotation calculation to the first coordinate with respect to the first receiving phase angle, thereby obtaining the eighth component of the third coordinate.

* * * * *